(12) United States Patent  
Silveira et al.

(10) Patent No.: US 9,828,815 B2
(45) Date of Patent: Nov. 28, 2017

(54) FOAMED FLUID COMPOSITIONS HAVING HIGH SALINITY USING ANIONIC SURFACTANTS AND METHODS THEREFOR

(71) Applicant: BAKER HUGHES INCORPORATED, Houston, TX (US)

(72) Inventors: Scott Joseph Silveira, Houston, TX (US); Sunder Ramachandran, Sugar Land, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 14/850,047

(22) Filed: Sep. 10, 2015

(65) Prior Publication Data

US 2016/0075932 A1    Mar. 17, 2016

Related U.S. Application Data

(60) Provisional application No. 62/049,140, filed on Sep. 11, 2014.

(51) Int. Cl.
| | |
|---|---|
| *E21B 21/14* | (2006.01) |
| *C09K 8/38* | (2006.01) |
| *C09K 8/584* | (2006.01) |
| *C09K 8/594* | (2006.01) |
| *C09K 8/70* | (2006.01) |
| *C09K 8/94* | (2006.01) |

(52) U.S. Cl.
CPC ............... *E21B 21/14* (2013.01); *C09K 8/38* (2013.01); *C09K 8/584* (2013.01); *C09K 8/594* (2013.01); *C09K 8/703* (2013.01); *C09K 8/94* (2013.01)

(58) Field of Classification Search
None
See application file for complete search history.

(56) References Cited

U.S. PATENT DOCUMENTS

| | | | | |
|---|---|---|---|---|
| 3,977,471 | A * | 8/1976 | Gale | C09K 8/584 |
| | | | | 166/270.1 |
| 5,031,698 | A | 7/1991 | Borchardt et al. | |
| 2004/0177958 | A1* | 9/2004 | Shpakoff | C09K 8/584 |
| | | | | 166/270.1 |
| 2005/0137114 | A1 | 6/2005 | Gatlin et al. | |
| 2008/0261835 | A1* | 10/2008 | Berger | C09K 8/584 |
| | | | | 507/244 |

(Continued)

OTHER PUBLICATIONS

Li, Robert Feng et al., "Foam Mobility Control for Surfactant Enhanced Oil Recovery", SPE-113910 (Mar. 2010).

(Continued)

*Primary Examiner* — Anuradha Ahuja
(74) *Attorney, Agent, or Firm* — Mossman Kumar & Tyler PC

(57) ABSTRACT

An effective amount of at least one anionic surfactant may be present within a high salinity foamed fluid composition in an effective amount to generate an IFT as low as $10^{-3}$ mN/m. The anionic surfactant may be a sulfonate surfactant and/or a sulfate surfactant. The foamed fluid composition may be used to perform an operation, including but not limited to, a gas lift operation, a drilling operation, a completion operation, a stimulation operation, a fracturing operation, an injection operation, an enhanced oil recovery operation, and combinations thereof.

11 Claims, 2 Drawing Sheets

(56) References Cited

U.S. PATENT DOCUMENTS

| | | | | |
|---|---|---|---|---|
| 2010/0282467 A1* | 11/2010 | Hutchison | ............ | C07C 303/06 |
| | | | | 166/305.1 |
| 2012/0101010 A1* | 4/2012 | Weerasooriya | .......... | C11D 1/06 |
| | | | | 507/259 |
| 2012/0125620 A1* | 5/2012 | Nguyen | .................. | C09K 8/94 |
| | | | | 166/309 |
| 2012/0285694 A1 | 11/2012 | Morvan et al. | | |
| 2013/0199788 A1* | 8/2013 | Barnes | .................... | E21B 43/16 |
| | | | | 166/305.1 |
| 2013/0277276 A1* | 10/2013 | Weerasooriya | ........ | C09K 8/584 |
| | | | | 208/435 |
| 2013/0296201 A1 | 11/2013 | Barnes et al. | | |

OTHER PUBLICATIONS

Puerto, Maura et al., "Surfactant systems for EOR in high temperature, high-salinity environments", SPE Journal, 2012, vol. 17, Issue 01, pp. 11-19.

\* cited by examiner

FOAMED FLUID COMPOSITIONS HAVING HIGH SALINITY USING ANIONIC SURFACTANTS AND METHODS THEREFOR

CROSS-REFERENCE TO RELATED APPLICATION

This application claims the benefit of U.S. Provisional Patent Application Ser. No. 62/049,140 filed Sep. 11, 2014, incorporated herein in its entirety by reference.

TECHNICAL FIELD

The present invention relates to methods and foamed fluid compositions using anionic sulfonate, sulfate, and betaine surfactants to form foamed fluid compositions, and more specifically relates to performing an operation with the foamed fluid composition, including a gas lift operation, a drilling operation, a completion operation, a stimulation operation, a fracturing operation, an injection operation, and combinations thereof.

BACKGROUND

Foamed fluids are used in a variety of applications during the recovery of hydrocarbons from subterranean reservoirs. A foamed fluid is a fluid that includes a base fluid, a foaming agent, and a gas, including but not limited to nitrogen, carbon dioxide, air, methane, and the like. The base fluid may be foamed to reduce the amount of base fluid required, to reduce the amount of fluid loss to the formation, and/or to provide enhanced proppant suspension in fracturing fluids. 'Foaming agent' is defined herein to be an agent for facilitating the foaming of a base fluid when gas is mixed therewith.

Foamed fluids may also be used during stimulation operations (e.g. unloading of gas wells) to displace any pre-existing fluid and/or formation fluid present in the wellbore. 'Pre-existing fluid' is defined herein as a fluid present in the subterranean reservoir wellbore prior to the introduction of the foaming additive and/or the foamed fluid composition into the subterranean reservoir wellbore. 'Formation fluid' is defined herein to be any fluid produced from an oil bearing subterranean formation including but not limited to oil, natural gas, water, and the like. Formation fluids may be considered pre-existing fluids, but pre-existing fluids may not necessarily be a formation fluid. For example, other downhole fluids may be injected into the subterranean reservoir wellbore and are still present in the wellbore when the foaming additive is introduced into the wellbore. Thus, the downhole fluid (e.g. drilling fluid, completion fluid, fracturing fluid, injection fluid, etc.) may be the 'base fluid' upon introduction of the foaming additive and gas into the subterranean reservoir wellbore.

The base fluid of a foamed fluid may be a drilling fluid, a completion fluid, a stimulation fluid, a fracturing fluid, an injection fluid, and combinations thereof. Non-limiting examples of the use of such fluids may involve unloading oil or gas wells, enhanced oil recovery operation, heavy oil recovery, a drilling operation, a fracturing operation, pressure pumping, cementing, acidizing or other stimulation operation, and the like.

A non-limiting example of a foamed drilling fluid may be one where the drilling operation requires the drilling fluid to have a low density; for example, the density of the foamed drilling fluid may range from about 2.0 ppg (about 0.24 g/cm$^3$) independently to about 8.0 ppg (about 0.96 g/cm$^3$).

Drilling fluids are typically classified according to their base fluid. In water-based fluids, solid particles are suspended in a continuous phase consisting of water or brine. Oil can be emulsified in the water, which is the continuous phase. "Water-based fluid" is used herein to include fluids having an aqueous continuous phase where the aqueous continuous phase can be all water or brine, an oil-in-water emulsion, or an oil-in-brine emulsion. Brine-based fluids, of course are water-based fluids, in which the aqueous component is brine.

Oil-based fluids are the opposite or inverse of water-based fluids. "Oil-based fluid" is used herein to include fluids having a non-aqueous continuous phase where the non-aqueous continuous phase is all oil, a non-aqueous fluid, a water-in-oil emulsion, a water-in-non-aqueous emulsion, a brine-in-oil emulsion, or a brine-in-non-aqueous emulsion. In oil-based fluids, solid particles are suspended in a continuous phase consisting of oil or another non-aqueous fluid. Water or brine can be emulsified in the oil; therefore, the oil is the continuous phase. In oil-based fluids, the oil may consist of any oil or water-immiscible fluid that may include, but is not limited to, diesel, mineral oil, esters, refinery cuts and blends, or alpha-olefins. Oil-based fluid as defined herein may also include synthetic-based fluids or muds (SBMs), which are synthetically produced rather than refined from naturally-occurring materials. Synthetic-based fluids often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these types.

One type of drilling operation involves cementing where cement is pumped into place in a wellbore. Cementing operations may be used to seal an annulus after a casing string has been run, to seal a lost circulation zone, to set a plug in an existing well from which to push off with directional tools, or to plug a well so that it may be abandoned. Before cementing operations commence, the volume of cement to be placed in the wellbore is determined, as well as the physical properties of the slurry and the set cement needed, including density and viscosity. The drilling fluids may be displaced to place the cement in the wellbore.

In carrying out primary cementing, as well as remedial cementing operations in wellbores, the cement slurries utilized must often be light-weight to prevent excessive hydrostatic pressure from being exerted on subterranean formations penetrated by the wellbore. As a result, a variety of light-weight cement slurries have been developed and used, including foamed cement slurries.

In addition to being light-weight, a foamed cement slurry contains compressed gas, which improves the ability of the slurry to maintain pressure and to prevent the flow of formation fluids into and through the slurry during its transition time, i.e., the time during which the cement slurry changes from a true fluid to a hard set mass. Other surfactants, besides those used as foaming agents, may be used as foam stabilizers for preventing the foam slurries from prematurely separating into slurry and gas components, and may also be added to the slurry. Foamed cement slurries may have low fluid loss properties.

There are a variety of functions and characteristics that are expected of completion fluids. The completion fluid may be placed in a well to facilitate final operations prior to initiation of production. Completion fluids are typically brines, including chlorides, bromides, formates, but may be any non-damaging fluid having proper density and flow characteristics. Suitable salts for forming the brines include, but are not necessarily limited to, sodium chloride, calcium chloride, zinc chloride, potassium chloride, potassium bromide, sodium bromide, calcium bromide, zinc bromide, sodium formate, potassium formate, ammonium formate, cesium formate, and mixtures thereof. Chemical compatibility of the completion fluid with the reservoir formation and fluids can be very important. Chemical additives, such as polymers and surfactants are known in the art for being introduced to the brines used in well servicing fluids for various reasons that include, but are not limited to, increasing viscosity, and increasing the density of the brine.

Servicing fluids, such as remediation fluids, stimulation fluids, workover fluids, and the like, have several functions and characteristics necessary for repairing a damaged well. Such fluids may be used for breaking emulsions already formed and for removing formation damage that may have occurred during the drilling, completion and/or production operations. The terms "remedial operations" and "remediate" are defined herein to include a lowering of the viscosity of gel damage and/or the partial or complete removal of damage of any type from a subterranean formation. Similarly, the term "remediation fluid" is defined herein to include any fluid that may be useful in remedial operations. A stimulation fluid may be a treatment fluid prepared to stimulate, restore, or enhance the productivity of a well, such as fracturing fluids and/or matrix stimulation fluids in one non-limiting example.

Hydraulic fracturing is a type of stimulation operation, which uses pump rate and hydraulic pressure to fracture or crack a subterranean formation in a process for improving the recovery of hydrocarbons from the formation. Once the crack or cracks are made, high permeability proppant relative to the formation permeability is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous-based liquids that have either been gelled or foamed to better suspend the proppants within the fluid.

An acidizing fluid may be pumped into a wellbore to remove near-well formation damage and/or other substances. An acidizing operation may enhance production by increasing the well radius. Sometimes acidizing is referred to as 'acid fracturing' when the operation is performed at pressures above the pressure required to fracture the formation. Acidizing operations may have a foaming additive added thereto for creating a foam diverter to divert the acid to a particular location within the wellbore.

Another type of stimulation operation is one where the oil or gas well is 'unloaded'. In most gas wells, water and/or condensate is produced along with gas. In mature gas wells, decreasing formation pressures and gas velocities gradually cause the wells to become "loaded" with liquids. Because of the difficulties in treating liquid-loaded wells with higher condensate cuts, operators may use a variety of methods to prevent liquid loading in marginal gas wells.

Unloading an oil or gas well may be necessary when a primary production technique (i.e., use of only the initial formation energy to recover the crude oil), followed by the secondary technique of waterflooding, recovers only a small percentage of the original oil in place present in the formation. The average recovery factor is around 25 to 35% for oil fields and around 70% for gas fields after secondary recovery operations. Gas well production and oil well production systems are generally limited in their production due to the load of oil and water in the flowlines.

Gas lift and/or deliquification of wells may enable wells with liquid loading issues to be returned to continuous flowing status, enhance the flow of a current producing well, restart a well, and combinations thereof. Typically, as the oil and/or gas is produced from the reservoir, the pressure of the reservoir formation decreases and the production declines. In addition, the production of the well may decline over time due to completion issues, and the well may become difficult to restart. A method commonly used to deliquify or 'unload' these wells is through the application of chemical foaming agents.

Injection fluids may be used in enhanced oil recovery (EOR) operations, which are sophisticated procedures that use viscous forces and/or interfacial forces to increase the hydrocarbon production, e.g. crude oil, from oil reservoirs. The EOR procedures may actually be initiated at any time after the primary productive life of an oil reservoir when the oil production begins to decline. The efficiency of EOR operations may depend on reservoir temperature, pressure, depth, net pay, permeability, residual oil and water saturations, porosity, fluid properties, such as oil API gravity and viscosity, and the like.

EOR operations are considered a tertiary method of hydrocarbon recovery and may be necessary when the primary and/or secondary recovery operation has left behind a substantial quantity of hydrocarbons in the subterranean formation. Primary methods of oil recovery use the natural energy of the reservoir to produce oil or gas and do not require external fluids or heat as a driving energy. The primary recovery method is followed by the secondary recovery method that involves activities such as infill drilling, pressure maintenance and water injection. Tertiary recovery or EOR methods are used to inject materials into the reservoir that are not normally present in the reservoir.

Secondary methods of oil recovery inject external fluids into the reservoir, such as water/and/or gas, to re-pressurize the reservoir and increase the oil displacement. Tertiary EOR methods include the injection of special fluids, such as chemicals, miscible gases and/or thermal energy. The EOR operations follow the primary operations and target the interplay of capillary and viscous forces within the reservoir. For example, in EOR operations, the energy for producing the remaining hydrocarbons from the subterranean formation may be supplied by the injection of fluids into the formation under pressure through one or more injection wells penetrating the formation, whereby the injection fluids drive the hydrocarbons to one or more producing wells penetrating the formation. EOR operations are typically performed by injecting the fluid through the injection well into the subterranean reservoir to restore formation pressure, improve oil displacement or fluid flow in the reservoir, and the like.

Examples of EOR operations include, but are not necessarily limited to, water-based flooding and gas injection methods. Water-based flooding may also be termed 'chemical flooding' if chemicals are added to the water-based injection fluid. Water-based flooding may be or include, polymer flooding, ASP (alkali/surfactant/polymer) flooding, SP (surfactant/polymer) flooding, low salinity water and microbial EOR; gas injection includes immiscible and miscible gas methods, such as carbon dioxide flooding, and the like. "Polymer flooding" comprises the addition of water-soluble polymers, such as polyacrylamide, to the injection fluid in order to increase the viscosity of the injection fluid to allow a better sweep efficiency by the injection fluid to displace hydrocarbons through the formation. The viscosified injection fluid may be less likely to by-pass the hydrocarbons and push the remaining hydrocarbons out of the formation.

The use of foam generated in situ by surfactant-alternating-gas (SAG) injection is described as a substitute for polymer drive in an alkaline/surfactant/polymer (ASP) enhanced oil recovery (EOR) process in R. F. Li, et al., "Foam Mobility Control for Surfactant Enhanced Oil Recovery," SPE 113910, SPE/DOE Symposium on Improved Oil Recovery, Tulsa, Okla., SPE Journal, March, 2010.

Micellar, alkaline, soap-like substances, and the like may be used to reduce interfacial tension between oil and water in the reservoir and mobilize the oil present within the reservoir; whereas, polymers, such as polyacrylamide or polysaccharide may be employed to improve the mobility ratio and sweep efficiency, which is a measure of the effectiveness of an EOR operation that depends on the volume of the reservoir contacted by the injected fluid.

When performing a polymer-in-solution flooding process, a polymer may increase the viscosity of the water to be closer to that of oil, so that less bypassing or channeling of the floodwater may occur. Said differently, the mobility of the floodwater may be decreased to provide a greater displacement of the flood front. Carbon dioxide ($CO_2$) injection is similar to water flooding, except that carbon dioxide is injected into an oil reservoir instead of water to increase the extraction of oil from the reservoir.

The alkaline/surfactant/polymer (ASP) technique may have a very low concentration of a surfactant to create a low interfacial tension between the trapped oil and the injection fluid/formation water. The alkali/surfactant/polymer present in the injection fluid may then be able to penetrate deeper into the formation and contact the trapped oil globules. The alkali may react with the acidic components of the crude oil to form additional surfactant in-situ to continuously provide ultra-low interfacial tension and free the trapped oil. With the ASP technique, polymer may be used to increase the viscosity of the injection fluid, to minimize channeling, and provide mobility control.

Present foaming technology is very responsive to high salinity; that is, high salinity brines disrupt the ability of the fluid to maintain an effective foam. Thus, it would be advantageous if foaming additives were designed for foamed fluids that can generate a very low interfacial tension, yet are capable of withstanding very high salinity environments.

SUMMARY

There is provided, in one form, a method that may include performing an operation with a foamed fluid composition. The foamed fluid composition may have or include a base fluid, a gas, at least one anionic surfactant having a hydrophobic chain of at least 20 carbon atoms, where the anionic surfactant is selected from the group consisting of sulfonate surfactants, sulfate surfactants, and combinations thereof, and at least one second surfactant selected from the group consisting of cationic surfactants, nonionic surfactants, zwitterionic surfactants, and combinations thereof. The foamed fluid composition has a salinity equal to or greater than 30,000 total dissolved solids (TDS).

In an alternative non-limiting embodiment of the method, the method may include unloading an oil or gas well within a subterranean oil-bearing formation by introducing a foamed fluid composition into the subterranean reservoir wellbore having a pre-existing fluid therein. The foamed fluid composition may have or include a base fluid, a gas, at least one anionic surfactant, and at least one second surfactant selected from the group consisting of cationic surfactants, nonionic surfactants, zwitterionic surfactants, and combinations thereof. The at least one anionic surfactant is selected from the group consisting of sulfonate surfactants and/or sulfate surfactants, where the anionic surfactant comprises a $C_{20}$-$C_{24}$ carbon chain and an internal olefin. The foamed fluid composition has a salinity equal to or greater than 30,000 TDS. The surfactants are present in an amount effective to foam the composition. The method further comprises at least partially displacing the pre-existing fluid within the subterranean reservoir wellbore.

There is further provided, in another form, a foamed fluid composition having a base fluid, a gas, at least one anionic surfactant, and at least one second surfactant. The base fluid may be or include an oil-based fluid, an aqueous-based fluid, and combinations thereof. The anionic surfactant has a hydrophobic chain of at least 20 carbon atoms, where the anionic surfactant is a sulfonate surfactant, a sulfate surfactant, or combinations thereof. The anionic surfactant is present in the foamed fluid composition in an amount effective to give an IFT between about $10^{-1}$ mN/m and about $10^{-3}$ mN/m. The at least one second surfactant includes, but is not necessarily limited to, cationic surfactants, nonionic surfactants, zwitterionic surfactants, and combinations thereof. The foamed fluid composition has a salinity equal to or greater than 30,000 total dissolved solids (TDS).

In another non-limiting embodiment of the foamed fluid composition, the anionic sulfonate surfactant(s) may have or include a $C_{20}$-$C_{24}$ carbon chain and an internal olefin therein, and the amount of the at least one anionic surfactant ranges from about 1 vol % to about 50 vol % based on the total foamed fluid composition.

DETAILED DESCRIPTION

Figure 1:
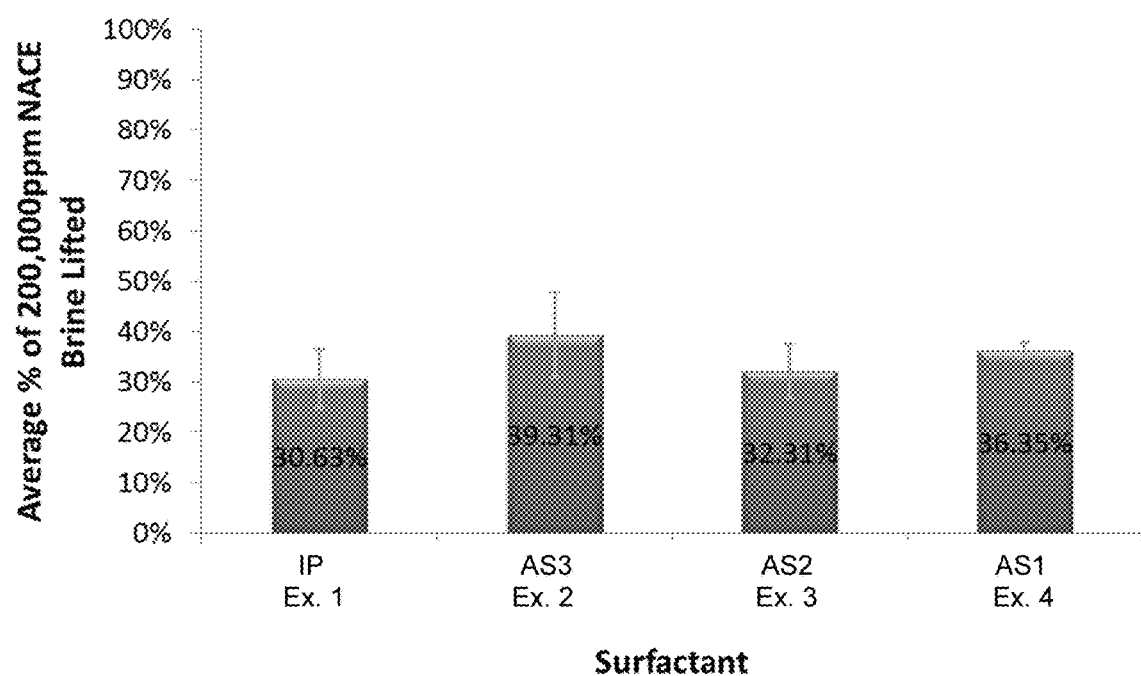
FIG. 1 is a chart of the average % of a 200,000 ppm TDS NACE brine fluid using 600 ppm of an incumbent surfactant alone, and together with 5 vol % of three different anionic surfactants together with the incumbent surfactant.

Salinity can play a major a role in reducing the performance of a foamer, possibly as major a role as that played by gas condensate. A chloride level (salinity) of 190,000 ppm is considered to be the upper limit for the current intermediates found in many foamer products. Current wells that inject foamers have an upper range of from about 150,000 to about 190,000 ppm, and it would be desirable to develop a product that could perform in and beyond this range.

As gas production in shale plays starts to decline, producers will increase their demand for foamers to keep their wells producing. Generally, these wells are the deeper, hotter, and are higher chloride concentration wells, where economic potential is tremendous for a high salinity product. Such a foamer could also be very effective for offshore foamer applications while providing an advantage over our competitors.

A goal of is to introduce ultra-low interfacial tension (IFT) surfactants that display a resistance to high salinity into the current foaming technology to create a high salinity-resistant foamer. Current commercially available surfactants, like anionic $C_{20-24}$ internal olefin sulfonates from Stepan and Shell, display the ability to generate IFT=$10^{-3}$ mN/m and remain minimally affected by salinity up to 80,000 ppm TDS. Research will be required to determine the proportions and types of chemicals needed to formulate an optimal product. Equilibration, phase separation, thermal stability, and foaming ability may be used to determine the effects of high salinity brines on the formulation. Comparative HNMR/IR (proton nuclear magnetic resonance/infrared) and other analytical techniques will be used to understand the effects.

Without wishing to limit the methods and compositions described herein, the added surfactant could bolster incumbent performance by a variety of methods, where two mechanisms seem most plausible, in separate non-limiting embodiments. Mechanism 1 would see the surfactant comingle with the foamer (e.g. second surfactant, as described herein) and improve resistance to salinity via diffusion. Mechanism 2 revolves around the reduction of water-air interfacial tension provided by the surfactant. It is also very plausible that a plurality of mechanisms increase the efficacy of the formulation.

It has been discovered that an effective amount of at least one anionic sulfonate or sulfate surfactant in combination with a second surfactant, in a non-limiting embodiment betaines, may be introduced into a base fluid to form a foamed fluid composition. The foamed fluid composition may generate an ultra-low interfacial tension (IFT), yet the foamed fluid composition may still be able to withstand a high salinity environment within a subterranean reservoir wellbore, and the foamed fluid composition may be used to perform an operation downhole, and the like.

By a "high salinity environment" is meant the foamed fluid composition has a salinity equal to or greater than 30,000 ppm total dissolved solids (TDS), in one non-limiting embodiment equal or greater than 30,000 ppm independently to about 250,000 ppm, in another non-restrictive version equal to or greater than 200,000, alternatively from 100,000 ppm independently to 250,000 ppm TDS, and in another non-limiting embodiment from about 200,000 ppm independently to about 300,000 TDS.

The base fluid may be or include, but is not limited to, an oil-based fluid, a water-based fluid, and combinations thereof. Non-limiting examples of the base fluid may be or include a drilling fluid, a completion fluid, an injection/EOR fluid, a fracturing fluid, a stimulation fluid, a gas well deliquification fluid, a coiled tubing (CT) operations fluid, a recycled drilling fluid, a servicing fluid, a well clean-out fluid, a well intervention fluid, a capillary coiled tubing (CCT) fluid, and combinations thereof for use during an operation, including but not necessarily limited to a gas lift operation, a drilling operation, a completion operation, a stimulation operation, a fracturing operation, an injection operation, and combinations thereof. Non-limiting examples of such operations may be or include pressure pumping, unloading oil or gas wells, cementing, acidizing, and combinations thereof. The foamed fluid compositions may also be referred to as downhole fluids herein.

In one non-limiting embodiment, the anionic sulfonate or sulfate surfactant has a hydrophobic chain of at least 20 carbon atoms; alternatively the anionic surfactant comprises a $C_{20}$ independently to $C_{24}$ carbon chain; alternatively the anionic surfactant a $C_{12}$ independently to $C_{24}$ carbon chain. As used in this disclosure, when the word "independently" is used with respect to a range, it means that any given threshold may be used together with any other threshold for that range type to give a suitable alternative range.

Further in another non-restrictive version, the at least one anionic sulfonate surfactant comprises an internal olefin or alcohol alkoxy sulfate. By "an internal olefin" is meant the molecule comprises an equilibrium mixture of double bonded isomers. Suitable specific anionic sulfonate surfactants include, but are not necessarily limited to, internal olefin sulfonates and alcohol alkoxy sulfates, and combinations thereof.

The effective amount of the at least one anionic sulfonate surfactant ranges from about 5 vol % independently to about 25 vol % based on the total foamed fluid composition; alternatively from about 1 vol % independently to about 50%; and in a different non-limiting embodiment ranges from about 10 vol % independently to about 35 vol %. One goal is for the effective amount of the anionic sulfonate surfactant to generate an IFT in the foamed fluid composition as low as $10^{-3}$ mN/m. In one non-limiting embodiment the anionic sulfonate surfactant generates an IFT in the foamed fluid composition between about $10^{-1}$ mN/m independently to about $10^{-3}$ mN/m.

The anionic sulfonate or sulfate surfactant(s) and/or gas may be introduced into the base fluid to form the foamed fluid composition prior to circulating the foamed fluid composition into a subterranean reservoir wellbore. The anionic sulfonate or sulfate surfactant(s) and/or gas may be introduced into the base fluid by a method, including but not limited to, adding the anionic sulfonate surfactant(s) and/or gas to the base fluid, circulating the anionic sulfonate or sulfate surfactant(s) and/or gas into the base fluid, continuously injecting the anionic sulfonate surfactant(s) and/or gas into the base fluid, intermittently injecting the anionic sulfonate or sulfate surfactant(s) into the base fluid, and combinations thereof. The anionic sulfonate or sulfate surfactant(s) and/or gas may be introduced into the base fluid as a single batch, a continuous batch, two or more batches, and combinations thereof. In a non-limiting embodiment, the anionic sulfonate or sulfate surfactant(s) is introduced into the base fluid at a different time and in a different manner as compared to the gas introduction.

A second surfactant used in the foamed fluid compositions may be present in a much higher proportion than the anionic surfactants previously described. In non-limiting embodiments, the second surfactant is greater than 50 vol % of the total surfactants present; alternatively is 75 vol % or greater; in another non-restrictive version is 85 vol % or greater; alternatively is 90 vol % or greater; or in another non-limiting embodiment is 95 vol % or greater. Further, suitable second surfactants may include, but not necessarily be limited to, cationic surfactants, nonionic surfactants, zwitterionic surfactants, and combinations of these. Suitable cationic surfactants may be or include, but are not limited to, arginine methyl esters, alkanolamines, and alkylenediamides, extended surfactants with propoxylated or ethoxylated spacer arms, and mixtures thereof. Suitable nonionic surfactants may be or include, but are not limited to, betaines, alkyl polyglycosides, sorbitan esters, methyl glucoside esters, polyglycol esters, alcohol ethoxylates, and mixtures thereof. Other suitable surfactants may be or include dimeric or gemini surfactants, cleavable surfactants, janus surfactants and extended surfactants, also called extended chain surfactants.

At the desired time, the foamed fluid composition may be broken with an effective amount of a defoamer to at least partially recover the base fluid and the anionic sulfonate surfactant(s). Suitable defoamers are those known to those in the art.

In a non-limiting embodiment, the operation may be or include unloading of a gas well where the foamed fluid composition may unload more than about 50 weight % of the base fluid within a subterranean reservoir wellbore. The anionic sulfonate surfactant(s) may be mixed with a gas and introduced into a base fluid to form the foamed fluid composition. The base fluid may be located at the surface or in the subterranean reservoir wellbore. Said differently, the base fluid may be a pre-existing or formation fluid in the wellbore, and the anionic sulfonate surfactant(s) and gas may be introduced thereinto. Alternatively, the foamed fluid composition may be formed at the surface and introduced into a subterranean reservoir wellbore to perform the desired operation. The foamed fluid composition may be controlled with conventional defoamers, which reduce the foam quality of the foamed fluid composition when desired.

The foamed fluid compositions may be introduced into the subterranean wellbore to displace pre-existing fluids and/or formation fluids to the surface in a non-limiting embodiment, which is also known as 'unloading' a well. The foamed fluid composition may be introduced into the well to lower the surface tension or interfacial tension of the pre-existing fluid within the well, as well as lower the critical velocity of the pre-existing fluid being produced from the well; all of which may allow for at least partially displacing the pre-existing fluid from the wellbore. Liquid loading is defined herein as the inability of a gas well to remove liquids that are produced from the wellbore. The displacement of the pre-existing fluid may occur in an amount of time less than about 30 minutes, alternatively from about 30 seconds independently to about 25 minutes, or from about 1 minute independently to about 20 minutes.

The anionic sulfonate or sulfate surfactant(s) may alleviate liquid loading by reducing fluid density, increasing oil and gas flow, reducing downtime of the well, alleviating slugging, and combinations thereof. The anionic sulfonate surfactant(s) may reduce the surface tension between the lift gas and the pre-existing fluid being lifted to the surface and/or may create a foam with the lift gas and the pre-existing fluid and/or formation fluid. Deliquification of the gas/oil well may be used to remove water or condensates build-up from producing gas/oil wells. The oil and/or gas may flow to the surface and carry liquids to the surface if the velocity of the gas is high enough. In a non-limiting embodiment, the anionic sulfonate surfactant(s) may display complete remediation of the fluid composition. "Complete remediation" refers to the collapse of the foam (gas entrained water) phase into the liquid phase. Said differently, a two-phase liquid and foam system may transform into a single phase liquid system.

Gases that may be used with the anionic sulfonate surfactant(s) may be or include, but are not limited to, nitrogen, carbon dioxide, methane, mixtures of methane with ethane, propane, butane, and higher hydrocarbon homologues. The gas(es) may be or include natural gas, produced gas, and combinations thereof.

In a non-limiting example, the anionic sulfonate or sulfate surfactant(s) may have a time-release mechanism, which may be or include, but is not limited to, microencapsulation of the anionic sulfonate or sulfate surfactant(s) within the base fluid or foamed fluid composition; emulsifying the anionic sulfonate or sulfate surfactant(s) into the base fluid or foamed fluid composition, and combinations thereof. The time-release mechanism may release the anionic sulfonate or sulfate surfactant(s) from the encapsulation or emulsification and into the base fluid or foamed fluid composition after a pre-determined condition, including but not limited to an amount of time, a change in temperature, a change in pressure, or another external force (e.g. breaking the emulsion) or combination thereof that would allow the anionic sulfonate surfactant(s) to be released.

The foamed fluid composition may unload less than about 60 weight % of the base fluid, or from about 15 independently to about 50 weight %. Alternatively, the foamed fluid composition may unload the base fluid in an amount ranging from about 30 weight % independently to about 49 weight %. 'Unload' is defined herein to be a displacement of the base fluid within the wellbore.

Particular formulations of the anionic sulfonate surfactant(s) or foamed fluid composition may depend on the types of base fluids, subterranean reservoir conditions, and the like. However, the base fluid may be or include an aqueous fluid, including but not limited to a brine-based fluid, water, sea water, and the like. Non-limiting examples of the base fluid are NACE brines (standard National Association of Corrosion Engineers brine). In another non-limiting embodiment, the base fluid may include the presence of hydrocarbon.

It is difficult to predict the exact conditions of the foamed fluid conditions in advance, and it is desirable for the anionic sulfonate surfactant(s) to be thermally stable at formation temperatures and/or well operating temperatures of the well being treated. However, in an effort to give a general idea of temperatures for which the anionic sulfonate surfactant(s) may function, the temperature of the base fluid or fluid composition may range from about ambient temperature (about 68° F. to about 74° F.; about 20° C. to 24° C.) independently to about 300° F. (about 149° C.), alternatively from about 100° F. (about 38° C.) independently to about 200° F. (about 93° C.), or from about 150° F. (about 65° C.) independently to about 190° F. (about 88° C.). The pH of the foamed fluid composition may be less than about 5, alternatively from about 2 independently to about 4.5, or from about 3 independently to about 4 in another non-limiting embodiment.

The invention will now be illustrated with respect to certain non-limiting examples which are not intended to limit the invention in any way but simply to further illuminate it with specific illustrations.

Examples

During evaluation, 600 ppm of the foam surfactant mixture was injected into a jacketed foam column which was previously charged with 200,000 ppm NACE brine (Table I), where $N_2$ was vigorously evolved through the column at 16 scfh to produce a foaming environment. Weight of the displaced fluid was observed and recorded. A final displacement time of 10 minutes, with an additional 2 minute observation to allow for completion, was allowed. A neat incumbent product (IP) was observed to provide comparative data. Anionic surfactants AS1, AS2 and AS3 as identified in Table I were used in Examples 4, 3 and 2, respectively. AS3 was used in Examples 2, 5 and 6 reported in Table II. As noted, the surfactants of interest were sulfates and sulfonates, but optimal additives could be a wide range of chemistries.

TABLE I

| Name | Chemistry | Structure |
|------|-----------|-----------|
| IP | Cocamidopropyl Betaine | $C_{19}H_{38}N_2O_3$ |
| AS1 | Internal Olefin Sulfonate | $C_{20-24}$ |
| AS2 | Alcohol Alkoxy Sulfate | $C_{12-13}$ |
| AS3 | Internal Olefin Sulfonate | $C_{20-24}$ |

Figure 2:
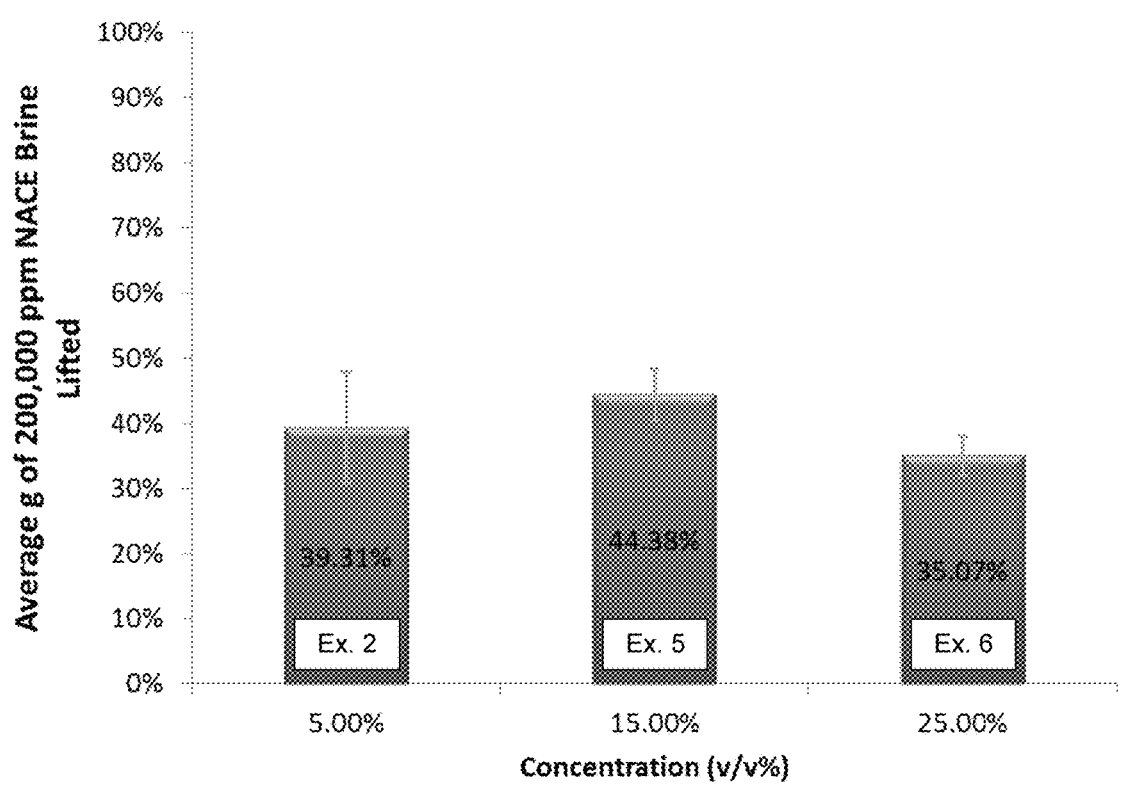
FIG. 2 is a chart of concentration for an anionic internal olefin sulfonate surfactant at three concentrations of 5.0 vol %, 15.0 vol % and 25 vol % together with 600 ppm of an incumbent surfactant.

In Examples 2, 3, and 4, 5% (v/v %) was used in the 600 ppm surfactant dosage. In all cases, it appears the introduction of salinity resistant surfactant has increased the carry-over properties of the incumbent. IP displayed 30.63%±5.84% brine carryover (Ex. 1) while the best results observed a 5% blended AS3 formulation carrying over 39.31%±8.49% of the brine (Ex. 2) (see FIG. 1). All formulations performed an average 5.36%±3.52% greater brine carryover compared to neat IP. All 5.0 vol % blends outperformed the incumbent. In one non-limiting hypothesis, it may be that the surfactants not only increase the resistance to salinity, but also aid in the creation of lamellae via decreased interfacial tension. Interestingly, a 15% AS3 formulation carried over 44.38%±4.00% brine (Ex. 5), which is 5.07% more fluid than the 5% formulation (see FIG. 2). A 25% AS3 formulation carried over 35.07%±3.01% brine (Ex. 6), which is 4.24% less than the 15% formulation (Ex. 5) but still 4.44% more fluid than neat IP (comparative Ex. 1). The 15% formulation (Ex. 5) created a continuous flow of structured uniform lamellae while the 5% formulation (Ex. 2) created a homogenous rigid white foam. The interfacial responsive surfactant displays synergism with the incumbent foamer at varying concentrations. The mechanism of interaction could possibly exist interfacially, allowing for higher foamer interaction with the brine, and chemically, via increasing stability in brine.

While limited in scope, the research performed thus far demonstrates the effectiveness of formulating incumbent brine chemistry with interfacially active surfactants. An increased tolerance to brine was observed by increased fluid carryover in all addition scenarios.

In the foregoing specification, the invention has been described with reference to specific embodiments thereof, and has been described as effective in providing methods and fluid compositions for using anionic sulfonate surfactants with various base fluids. However, it will be evident that various modifications and changes can be made thereto without departing from the broader scope of the invention as set forth in the appended claims. Accordingly, the specification is to be regarded in an illustrative rather than a restrictive sense. For example, specific anionic sulfonate surfactants, second surfactants, base fluids, additional components, operations, and the like falling within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For instance, the method may consist of or consist essentially of performing an operation with a foamed fluid composition; where the foamed fluid composition comprises, consists of, or consists essential of a base fluid, a gas, at least one anionic sulfonate surfactant and/or anionic sulfate surfactant having a hydrophobic chain of at least 20 carbon atoms, and at least one second surfactant selected from the group consisting of cationic surfactants, nonionic surfactants, zwitterionic surfactants, and combinations thereof, where the foamed fluid composition has a salinity equal to or greater than 30,000 ppm total dissolved solids (TDS)

The foamed fluid composition may consist of or consist essentially of a base fluid, a gas, at least one anionic surfactant and at least one second surfactant; where the base fluid may be or include an oil-based fluid, an aqueous-based fluid, and combinations thereof. The anionic surfactant may be an anionic sulfonate surfactant and/or an anionic sulfate surfactant. The anionic surfactant is present in the foamed fluid composition in an amount effective to give an IFT between about $10^{-1}$ mN/m and about $10^{-3}$ mN/m. The at least one second surfactant selected from the group consisting of cationic surfactants, nonionic surfactants, zwitterionic surfactants, and combinations thereof. The foamed fluid composition has a salinity equal to or greater than 30,000 total dissolved solids (TDS).

The words "comprising" and "comprises" as used throughout the claims, are to be interpreted to mean "including but not limited to" and "includes but not limited to", respectively.

What is claimed is:

1. A method comprising:
    introducing a foamed fluid composition within a subterranean reservoir wellbore of an oil or gas well and performing an operation with the foamed fluid composition;
        where the foamed fluid composition comprises:
            a base fluid, wherein the base fluid is an oil-based fluid or a water-based fluid selected from a group consisting of a drilling fluid, a completion fluid, a stimulation fluid, a fracturing fluid, a gas well deliquification fluid, a coiled tubing operations fluid, a recycled drilling fluid, a servicing fluid, a well clean-out fluid, a well intervention fluid, a capillary coiled tubing fluid and combinations thereof,
            a gas,
            at least one anionic surfactant having a hydrophobic chain of 12 to 24 carbon atoms, where the anionic surfactant is selected from the group consisting of sulfonate surfactants, sulfate surfactants, and combinations thereof, and
            at least one second surfactant selected from the group consisting of cationic surfactants, nonionic surfactants, zwitterionic surfactants, and combinations thereof;
        where the foamed fluid composition has a salinity equal to or greater than 30,000 ppm total dissolved solids; and unloading more than about 50 weight % of a pre-existing fluid within the subterranean reservoir wellbore with the foamed fluid composition in an amount of time of less than about 30 minutes.

2. The method of claim 1, where the at least one anionic surfactant comprises a hydrophobic chain of from 20 to 24 carbon atoms, inclusive.

3. The method of claim 1, where the at least one anionic surfactant comprises an internal olefin.

4. The method of claim 1, where the at least one anionic surfactant is capable of generating an interfacial tension of between about $10^{-1}$ mN/m and about $10^{-3}$ mN/m.

5. The method of claim 1, where the operation is conducted in an environment selected from the group consisting of a subterranean reservoir, a wellbore, a gas well, and combinations thereof.

6. The method of claim 1, where the foamed fluid composition further comprises an additional component selected from the group consisting of solvents, winterizing agents, foam enhancers, biocides, shale stabilizers, paraffin dispersants, emulsion breakers, and combinations thereof.

7. The method of claim 1, further comprising introducing the at least one anionic surfactant to the base fluid to form the foamed fluid composition prior to circulating the foamed fluid composition in the subterranean reservoir wellbore.

8. The method of claim 7, where the introducing the at least one anionic surfactant occurs by a method selected from the group consisting of adding the at least one anionic surfactant to the base fluid, circulating the at least one anionic surfactant into the base fluid, continuously or intermittently injecting the at least one anionic surfactant into the base fluid, and combinations thereof.

9. The method of claim 7, where the introducing the at least one anionic surfactant occurs in batch form or continuously.

10. The method of claim 1 where the operation is selected from the group consisting of a gas lift operation, a drilling operation, a completion operation, a stimulation operation, a fracturing operation, an injection operation, an enhanced oil recovery operation, and combinations thereof.

11. A method for unloading an oil or gas well within a subterranean oil-bearing formation comprising:

introducing a foamed fluid composition into a subterranean reservoir wellbore having a pre-existing fluid therein; where the foamed fluid composition comprises:
- a base fluid, wherein the base fluid is selected from a group consisting of a drilling fluid, a completion fluid, a stimulation fluid, a fracturing fluid, a gas well deliquification fluid, a coiled tubing operations fluid, a recycled drilling fluid, a servicing fluid, a well clean-out fluid, a well intervention fluid, a capillary coiled tubing fluid and combinations thereof;
- a gas;
- at least one anionic surfactant selected from the group consisting of sulfonate surfactants, sulfate surfactants, and combinations thereof, where the at least one anionic surfactant comprises a $C_{12}$-$C_{24}$ carbon chain and an internal olefin, and where the foamed fluid composition has a salinity equal to or greater than 30,000 ppm total dissolved solids; and
- at least one second surfactant selected from the group consisting of cationic surfactants, nonionic surfactants, zwitterionic surfactants, and combinations thereof;

where the at least one anionic surfactant and the at least one second surfactant are present in an amount effective to foam the composition; and displacing more than about 50 weight % of the pre-existing fluid within the subterranean reservoir wellbore, wherein the displacement of the pre-existing fluid occurs in an amount of time of less than about 30 minutes.

* * * * *